United States Patent [19]

So et al.

[11] Patent Number: 4,730,171

[45] Date of Patent: Mar. 8, 1988

[54] OPTICAL SIGNAL MODULATORS

[75] Inventors: Vincent C. So; Paul J. Vella; Richard P. Hughes, all of Edmonton, Canada

[73] Assignee: Northern Telecom Limited, Montreal, Canada

[21] Appl. No.: 856,887

[22] Filed: Apr. 28, 1986

[51] Int. Cl.$^4$ ............................. G02F 1/34; G02B 5/14
[52] U.S. Cl. .................................. 332/7.51; 350/96.29
[58] Field of Search ............... 350/96.14, 96.15, 96.29, 350/96.30; 332/7.51

[56] References Cited

U.S. PATENT DOCUMENTS

| | | | |
|---|---|---|---|
| 3,208,342 | 9/1965 | Nethercot, Jr. | 350/96.29 |
| 3,312,827 | 4/1967 | McNaney | 350/96.29 X |
| 3,770,339 | 11/1973 | Ramaswamy | 350/96.14 |
| 3,923,373 | 12/1975 | Dabby et al. | 350/96.14 X |
| 4,185,884 | 1/1980 | McMahon | 350/96.14 |
| 4,386,822 | 6/1983 | Bergh | 350/96.15 |
| 4,387,954 | 6/1983 | Beasley | 350/96.15 |
| 4,392,712 | 7/1983 | Ozeki | 350/96.15 X |
| 4,461,536 | 7/1984 | Shaw et al. | 350/96.29 X |
| 4,474,431 | 10/1984 | Bricheno | 350/96.15 |

FOREIGN PATENT DOCUMENTS

| | | | |
|---|---|---|---|
| 0010701 | 1/1983 | Japan | 350/96.29 |
| 0148030 | 8/1984 | Japan | 350/96.29 |

OTHER PUBLICATIONS

"High-Speed Cutoff Modulator Using a Ti-Diffused LiNbO$_3$ Channel Waveguide", by A. Neyer and W. Sohler, pp. 256–258, Appl. Phys. Lett. 35(3), Aug. 1, 1979, American Institute of Physics.
"Analysis of a Tunable Single Mode Optical Fiber", by Michel J. F. Digonnet and Herbert J. Shaw, IEEE Journal of Quantum Electronics, pp. 746–754, vol. QE-18, No. 4, Apr. 1982.
"Nonlinear Single-Mode Fiber Coupler Using Liquid Crystals", by E. S. Goldburt and P. St. J. Russell, Appl. Phys. Lett. 46, 338 (1985).
"Electro-Optical Response of a Liquid-Crystalline Fiber Coupler", by E. S. Goldburt and P. St. J. Russell, Appl. Phys. Lett. 48(1), Jan. 6, 1986, pp. 10–12.
"Optical Pulse Compression and Breaking in Nonlinear Fibre Couplers", by R. Hoffe and J. Chrostowski, pp. 34–38, vol. 57, No. 1, Optics Communications, Feb. 1, 1986.

Primary Examiner—Thomas H. Tarcza
Assistant Examiner—Mark Hellner
Attorney, Agent, or Firm—R. John Haley

[57] ABSTRACT

An optical fiber having a core and a cladding has its cladding interrupted and an electro-optic crystal disposed at the interruption, a modulating electric field being applied via electrodes to the crystal to control its refractive index and thereby modulate an optical signal carried by the fiber. In one embodiment the interruption in the cladding extends all around the core. In another embodiment the fiber is embedded in a curved position in epoxy material, and the epoxy material and fiber are ground down on the outside of the curve to interrupt the cladding and expose the core, the electro-optic crystal being provided on the ground surface. A second fiber can be inverted on the crystal to provide an optical coupler. The electro-optic crystal is for example a single crystal of a tetragonal phosphate.

11 Claims, 5 Drawing Figures

OPTICAL SIGNAL MODULATORS

This invention relates to modulators for modulating optical signals carried by optical fibers.

It is known to transmit information using a modulated optical signal which is carried by or transmitted via an optical fiber. It is commonly desired to transmit the information at increasingly higher rates, for example at bit (binary digit) rates in excess of 1 Gbps (gigabit per second), and over increasing distances.

To these ends, it is known to use as an optical source a laser which is operated in a single mode, i.e. to generate an optical signal having a narrow spectral width, in order to reduce the adverse effects of dispersion of the transmitted optical signal. However, direct modulation, i.e. switching on and off, of the laser tends to produce so-called chirping, or broadening of the spectral width of the generated optical signal, which is undesirable for effective transmission of information at high bit rates and over long distances.

Accordingly, especially for high speed transmission, it is also known to operate the laser constituting the optical source in a continuous wave mode, whereby it produces an unmodulated optical signal with a relatively narrow spectral bandwidth, and to use a separate or external modulator to modulate this optical signal with the information to be transmitted. One known external modulator comprises an interferometer, constituting a modulating element, which is disposed between two aligned optical fibers, one of which supplies the optical signal to be modulated and from the other of which the modulated optical signal is derived. However, such a modulator has a relatively high insertion loss due to mismatching, and requires precise alignment of the fiber and channel waveguide, so that it is relatively fragile and is expensive to produce.

An object of this invention, therefore is to produce an improved optical signal modulator.

According to this invention there is provided an optical signal modulator comprising: an optical fiber, comprising a core and a cladding, for carrying an optical signal to be modulated; an interruption in said cladding; an electro-optic crystal disposed at said interruption; and means for applying a modulating electric field to the electro-optic crystal to vary the refractive index thereof thereby to modulate the optical signal.

Thus in a modulator in accordance with the invention the optical fiber is continuous, so that there is no requirement for precise alignment of different fibers, and insertion loss is reduced.

The electro-optic crystal disposed at the interruption in the cladding serves to act as a continuation of the cladding if its refractive index is lower than that of the core, or to allow an optical signal carried by the core to passout of the core if its refractive index is equal to or higher than that of the core. Thus the electric field, which controls the refractive index of the electro-optic crystal, servces to control the amount of light which is lost from the core, and hence the amount of an optical signal which remains in the fiber core.

The electro-optic crystal is a material in which electronic dipoles are aligned by an applied electric field to provide an electro-optic effect, as distinct from liquid crystal materials in which molecular dipoles are aligned by an applied electric field. The electro-optic crystal response is sufficiently fast for the high information rates with which it is desired to modulate an optical signal, in contrast to the response speed of liquid crystal materials in which the alignment of molecules takes place much too slowly for use of such materials in a practical optical signal modulator.

The electro-optic crystal is conveniently a single crystal of a tetragonal phosphate material.

In one embodiment of the invention the means for applying a modulating electric field to the electro-optic crystal comprises a plurality of spaced electrodes on the crystal, the interruption in the cladding extends substantially all around the optical fiber core along a portion of the length thereof, the electro-optic crystal comprises a plurality of electro-optic crystal members disposed substantially all around the optical fiber core at the interruption in the cladding, and the means for applying a modulating electric field comprises a plurality of spaced electrodes on each electro-optic crystal member, each electro-optic crystal member preferably comprising a single crystal of a tetragonal phosphate.

In another embodiment of the invention, in which the modulator also comprises means for holding a portion of the optical fiber in a curved position, the interruption in the cladding is on the outside of the curve. In this case the interruption in the cladding preferably comprises a substantially flat surface formed on the optical fiber on the outside of said curve and extending to the core of the fiber, and the electro-optic crystal preferably has a substantially flat surface abutting the substantially flat surface formed on the optical fiber.

The holding means preferably comprises material, for example epoxy material, in which the curved portion of the optical fiber is embedded. This provides a particularly strong and stable arrangement, which facilitates forming of the flat surface on the optical fiber for example by grinding a surface of the embedding material on the outside of the curve of the fiber, until the fiber core is exposed. The means for applying a modulating electric field preferably comprises a plurality of spaced electrodes, which may be provided on the electro-optic crystal or may also by embedded in the epoxy material.

The invention also provides an optical signal coupler comprising: two optical fibers each comprising a core and a cladding; means for holding a portion of each optical fiber in a curved position with the outsides of the curves in the two fibers opposite one another; a substantially flat surface formed on each optical fiber on the outside of the respective curve and extending to the core of the respective fiber thereby interrupting the cladding of the respective fiber; an electro-optic crystal having substantially flat opposite surfaces each abutting the substantially flat surface formed on a respective one of the optical fibers; and means for applying an electric field to the electro-optic crystal to vary the refractive index thereof thereby to control coupling of an optical signal between the optical fibers.

The invention will be further understood from the following description with reference to the accompanying drawings, in which.

Figure 1:
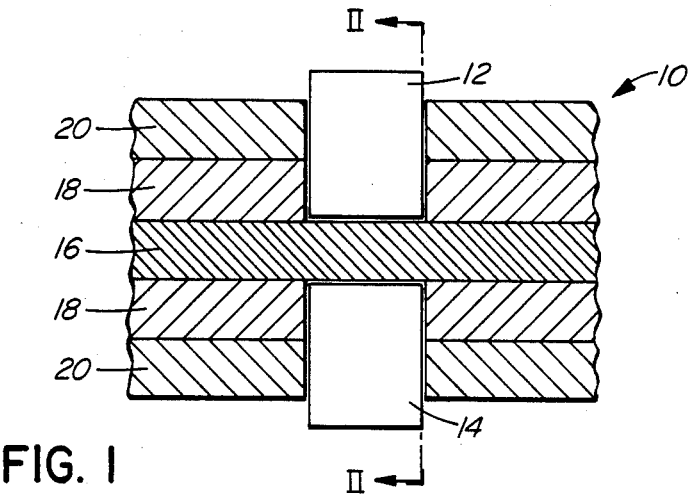
FIG. 1 is a longitudinal cross-sectional illustration of an optical signal modulator in accordance with an embodiment of the invention.
Figure 2:
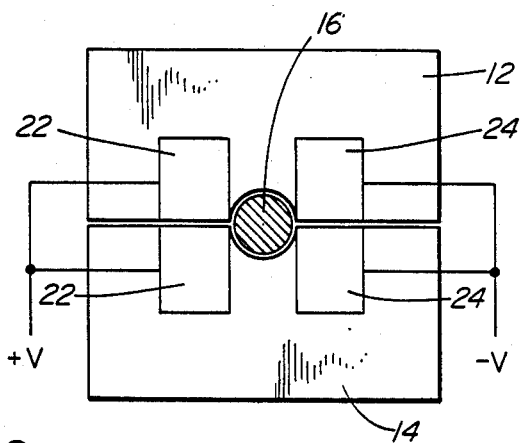
FIG. 2 is a transverse cross-sectional illustration of the modulator of FIG. 1, the section being taken on the line II—II of FIG. 1.

Referring to FIGS. 1 and 2, the optical signal modulator illustrated therein comprises an optical fiber 10 and two electro-optic crystals 12 and 14.

The optical fiber 10 is a single mode optical fiber which consists of a core 16, a cladding 18, and a coating 20. an optical signal to be modulated, for example produced by a continuous-wave laser, is propagated in known manner in either direction along the fiber 10 by virtue of the fact that the cladding 18 has a lower refractive index than the core 16. The coating 20 serves to provide mechanical support for the fiber 10.

At a desired location for a distance of about 1mm along its length the fiber 10 has its coating 20 removed and its cladding 18 etched away thereby to expose its core 16. The two electro-optic crystals 12 and 14 are disposed on each side of the core 16 in this exposed region, and are shaped and sized as shown in FIGS. 1 and 2 so that they substantially completely fill the space left by the etched away or interrupted cladding 18. A known index matching fluid, which is not represented for the sake of clarity in the drawings, fills any residual space between the electro-optic crystals and the core 16 and cladding 18.

Each of the electro-optic crystals 12 and 14 has, formed on a face thereof which is transverse to the longitudinal direction of the fiber 10, two spaced electrodes 22 and 24 which serve for applying a modulating electric field to the respective crystal for controlling the refractive index thereof at least in the region thereof adjacent to the core 16. To this end a modulating signal voltage $+V$, $-V$ is applied to the respective electrodes 22, 24.

Each electro-optic crystal 12, 14 is a single crystal of a tetragonal phosphate, such as ADP (Ammonium Dihydrogen Phosphate, $NH_2H_2PO_4$), KDP (Potassium Dihydrogen Phosphate, $KH_2PO_4$), or RDP (Rubidium Dihydrogen Phosphate, $RbH_2PO_4$), or the equivalent crystals grown in heavy water ($D_2O$) solution instead of in water, such as D-KDP also referred to as KD*P, (Potassium Dideuterium Phosphate, $KD_2PO_4$). The cut of the crystals 12, 14 and the orientation of the electrodes 22, 24 are selected to provide a maximum electro-optic effect in the regions of the crystals adjacent to the core 16.

Each electro-optic crystal 12, 14, and the material used for the cladding 18, are selected so that in the absence of any modulating signal the refractive index of each electro-optic crystal 12, 14 is equal to or slightly less than that of the cladding 18. As a result, in the absense of any modulating signal the crystals act in the same manner as the cladding which they replace, whereby an optical signal propagated along the fiber 10 is substantially unaffected by the modulator. In the presence of a modulating signal applied between the electrodes 22 and 24 the refractive index of the electro-optic crystals 12 and 14 is increased to an extent dependent upon the magnitude of the modulating signal. As a result of this increased refractive index, and in particular as a result of the refractive index of the crystals 12 and 14 being increased above that of the core 16, light can escape from the core 16 whereby a reduced level of the optical signal is propagated along the fiber 10 past the modulator. The modulating signal thereby modulates the level of the propagated optical signal.

Although not illustrated in FIGS. 1 and 2, the modulator can be embedded in epoxy material to provide mechanical stability.

Figure 3:
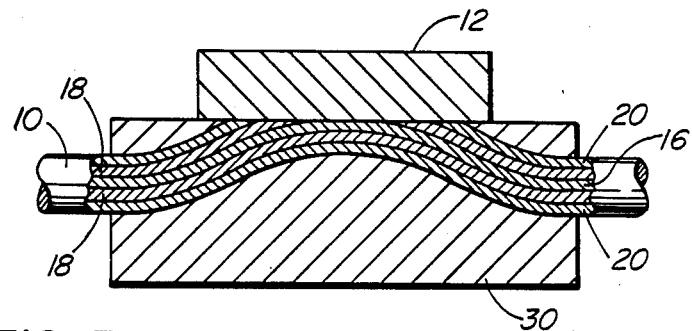
FIG. 3 is a longitudinal cross-sectional illustration of an optical signal modulator in accordance with another embodiment of the invention.
Figure 4:
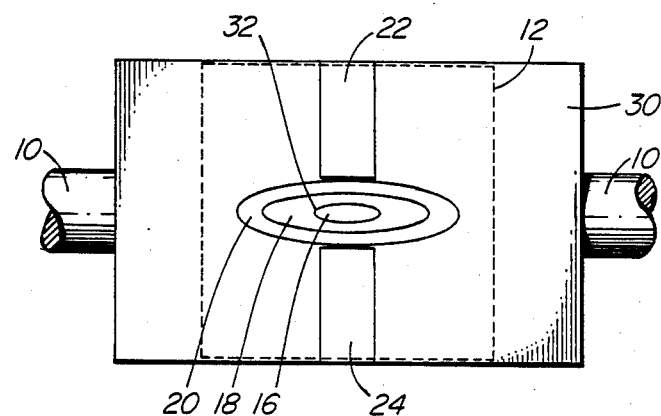
FIG. 4 is a plan view of the modulator of FIG. 3 with an electro-optic crystal thereof removed.

FIGS. 3 and 4 illustrate an alternative form of optical signal modulator, similar references being used to denote parts which correspond to those used in the modulator of FIGS. 1 and 2.

Referring to FIGS. 3 and 4, the optical fiber 10, comprising the core 16, cladding 18, and coating 20 and carrying an optical signal to be modulated, is embedded in a block 30 of epoxy material in such a manner that the fiber is bent in a gradual curve so that it reaches one surface of the block 30, the upper surface of the block 30 as illustrated in FIG. 3. After this embedding, this upper surface of the block 30, and the exposed parts of the fiber 10 therewith, is ground down to expose the core 16, in an oval region 32 as shown in the plan view of the FIG. 4, in this upper surface. Two electrodes 22, 24, one on each side of the region 32, are similarly embedded in this upper surface of the epoxy block 30 and are similarly ground down in the grinding of this surface.

An electro-optic crystal 12, such as a single crystal of a tetragonal phosphate which is cut and orientated to provide a maximum electro-optic effect adjacent to the region 32, is disposed on the ground upper surface of the block 32 so as to overlie the region 32, with index matching fluid (not shown) therebetween, and the electrodes 22 and 24. The crystal 12 is for example about 1 cm square, its position being indicated in FIG. 4 by broken lines.

In a similar manner to that already described with reference to FIGS. 1 and 2, a modulating signal applied between the electrodes 22 and 24 subjects the electro-optic cyrstal 12 to an electric field to modulate its refractive index in the area of the crystal adjacent to the region 32, thereby to modulate the optical signal carried by the optical fiber 10.

The modulator of FIGS. 3 and 4 is preferred over that of FIGS. 1 and 2 in view of its mechanical stability due to the embedding of the fiber 10 in the epoxy block 30, the relative ease of interrupting the cladding 18 to expose the core 16 by grinding as described above, and the application of such modulators to form couplers as described below with reference to FIG. 5.

Figure 5:
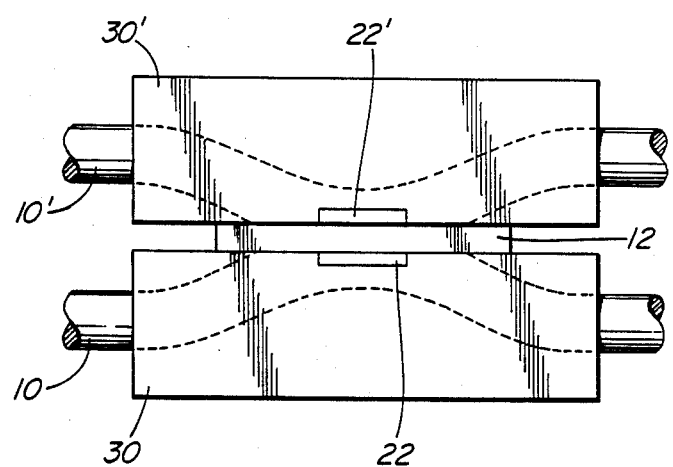
FIG. 5 is a longitudinal illustration of a coupler constituted by coupler modulators.

Referring to FIG. 5, the optical signal coupler illustrated therein effectively consists of two optical signal modulators each as described with reference to FIGS. 3 and 4, one inverted over the other with the two modulators sharing the same electro-optic crystal 12. Thus the coupler comprises two optical fibers 10, 10' embedded in respective blocks 30, 30' of epoxy material with respective electrodes 22, 22' (illustrated) and 24, 24' (not illustrated) which are interconnected to apply a modulating or coupling control electric field to the crystal 12. A single pair of electrodes could alternatively be used, but two pairs are preferred to achieve a more uniform field. Application of an electrical field via the electrodes to the crystal causes an optical signal in one fiber, for example the fiber 10, to be coupled partly or entirely to the other fiber, for example 10'. Thus such a coupler can be used to switch or distribute an optical signal between two fibers. Reflecting surfaces can be provided, for example on edges of the crystal 12, to avoid undesired loss of light.

In FIG. 5 the electro-optic crystal has been illustrated for clarity as having appreciable thickness. In practice, this crystal may be very thin, for example only a few tens micrometers thick. Accordingly this diagram, and similarly all of the others, are not intended to be scale illustrations, but rather are drawn for clarity and to provide a clear explanation of embodiments of the invention.

While particular embodiments of the invention have been described in detail, it should be appreciated that numerous modifications, variations, and adaptations may be made thereto without departing from the scope of the invention as defined in the claims. In particular, it is observed that in FIGS. 3 to 5 the electrodes may be formed on the surface of the electro-optic crystal rather than being formed in the respective surface of the block of epoxy material.

In this respect it is also observed that, whilst the described modulators and coupler are capable of operating at high information rates, for example well in excess of 1Gbps, the actual information rate which can be handled is limited predominantly by the capacitance of the electrodes. Smaller electrodes can be used to accommodate increased information rates with smaller modulation depths. Alternatively, the electrodes can be constructed in the form of microstrip transmission lines carrying a travelling wave at an increased information rate.

It is also observed that the refractive index of the electro-optic crystal may be decreased from a value above to a value below that of the fiber core as a result of the application of the electric field, instead of being increased in the presence of the field as described above.

What is claimed is:

1. An optical signal modulator comprising:
   an optical fiber, comprising a core and a cladding, for carrying an optical signal to be modulated;
   an interruption in said cladding, the core being continuous at said interruption;
   an electro-optic crystal of a tetragonal phosphate material disposed at said interruption; and
   means for applying a modulating electric field to the electro-optic crystal to vary the refractive index thereof, thereby to modulate the optical signal.

2. A modulator as claimed in claim 1 wherein the means for applying a modulating electric field to the electro-optic crystal comprises a plurality of spaced electrodes on the crystal.

3. A modulator as claimed in claim 1 wherein the interruption in the cladding extends substantially all around the optical fiber core along a portion of the length thereof.

4. A modulator as claimed in claim 3 wherein the electro-optic crystal comprises a plurality of electro-optic crystal members disposed substantially all around the optical fiber core at the interruption in the cladding, and the means for applying a modulating electric field comprises a plurality of spaced electrodes on each electro-optic crystal member.

5. A modulator as claimed in claim 4 wherein each electro-optic crystal member comprises a single crystal of a tetragonal phosphate.

6. A modulator as claimed in claim 1 and comprising means for holding a portion of the optical fiber in a curved position, wherein the interruption in the cladding is on the outside of the curve.

7. A modulator as claimed in claim 6 wherein the interruption in the cladding comprises a substantially flat surface formed on the optical fiber on the outside of said curve and extending to the core of the fiber.

8. A modulator as claimed in claim 7 wherein the electro-optic crystal has a substantially flat surface abutting the substantially flat surface formed on the optical fiber.

9. A modulator as claimed in claim 6 wherein the holding means comprises material in which said portion of the optical fiber is embedded.

10. A modulator as claimed in claim 8 wherein the means for applying a modulating electric field comprises a plurality of spaced electrodes and the holding means comprises material in which said portion of the optical fiber and said electrodes are embedded.

11. A modulator as claimed in claim 9 wherein the holding means comprises epoxy material.

* * * * *